United States Patent
Judd et al.

[11] Patent Number: 5,958,064
[45] Date of Patent: Sep. 28, 1999

[54] MULTIPLE NODE DUAL LEVEL ERROR RECOVERY SYSTEM AND METHOD

[75] Inventors: Ian David Judd, Winchester; Reginald Beer, Chandlers Ford, both of United Kingdom

[73] Assignee: International Business Machines Corporation, Armonk, N.Y.

[21] Appl. No.: 08/956,919

[22] Filed: Oct. 23, 1997

Related U.S. Application Data

[63] Continuation of application No. 08/565,930, Dec. 1, 1995, abandoned, which is a continuation of application No. 08/074,183, Jun. 9, 1993, abandoned.

[30] Foreign Application Priority Data

Jun. 20, 1992 [GB] United Kingdom .................... 9213151

[51] Int. Cl.[6] ...................................................... G06F 11/00
[52] U.S. Cl. ............................................................... 714/4
[58] Field of Search .................. 395/182.02, 182.13, 395/182.14, 182.15, 182.16, 182.17; 370/216, 217, 218, 219, 220, 221, 222, 223, 224, 225, 226, 227, 228

[56] References Cited

U.S. PATENT DOCUMENTS

| | | | |
|---|---|---|---|
| 4,356,546 | 10/1982 | Whiteside et al. | 395/182.08 |
| 4,412,281 | 10/1983 | Works | 395/575 |
| 4,438,494 | 3/1984 | Budde et al. | 395/575 |
| 4,503,535 | 3/1985 | Budde et al. | 371/11.3 |
| 5,247,664 | 9/1993 | Thompson et al. | 395/600 |
| 5,271,013 | 12/1993 | Gleeson | 371/9.1 |
| 5,325,518 | 6/1994 | Bianchini, Jr. | 395/575 |
| 5,390,326 | 2/1995 | Shah | 395/182.02 |
| 5,398,329 | 3/1995 | Hirata et al. | 395/575 |
| 5,440,688 | 8/1995 | Nishida | 395/182.02 |

*Primary Examiner*—Joseph E. Palys
*Assistant Examiner*—Scott T. Baderman
*Attorney, Agent, or Firm*—Merchant & Gould P.C.

[57] ABSTRACT

An error recovery method for use in an information communication system which comprises a plurality of nodes connected by links. Information is transferred between the nodes in frames of predefined types, including at least a first frame type used to transfer data and a second frame type used for error recovery. Each node has at least a first and a second mode of operation. In the first mode frames of both first and second types are accepted. In the second mode frames of the first type are discarded and only frames of the second type are accepted. A master node which controls error recovery is selected from amongst those nodes which can initiate transfers.

24 Claims, 3 Drawing Sheets

MULTIPLE NODE DUAL LEVEL ERROR RECOVERY SYSTEM AND METHOD

This is a continuation of Ser. No. 08/565,930, filed Dec. 1, 1995, now abandoned, which is a continuation of Ser. No. 08/074,183, filed Jun. 9, 1993, now abandoned.

BACKGROUND OF THE INVENTION

1. Field of the Invention

This invention relates generally to the field of information communication between nodes in a network and more specifically to recovering from errors occurring during the transmission of data between nodes.

2. Description of the Prior Art

A variety of different types of network configurations have been proposed or used for transmitting data between interconnected nodes in a network. For example, Local Area Networks (LAN's) comprise a number of computer based pieces of equipment which are normally distributed within a single establishment. A LAN is most commonly arranged into one of three basic topologies, namely star, bus and ring. More complex network configurations are possible by interconnecting a number of different LAN's by means of switches in the form of bridges or routers.

These networks include some type of error recovery method. This includes a means of detecting an error and a means of correcting the error. The means of detecting the error can typically include a parity check on each byte or small quantity of information transferred. A parity check is the addition of usually a single bit by the transmitter to make the simple arithmetic summation of all of the bits within, for example a byte, transmitted into either an even number for even parity, or an odd number for odd parity. A parity check will usually detect one bit errors and so is mainly used over short distances with transmission paths of high integrity.

For longer distances, or for transmission paths of lower integrity, a CRC (cyclic redundancy check) can be used. A CRC typically consists of one of two bytes that are sent for each block of bytes transmitted, such as after each 128, 256 or 512 byte block. The particular CRC used is defined by the polynomial used to calculate it. A typical polynomial would be $X16+X15+X2+1$. The least significant one or two bytes are taken and transmitted after the data. The receiver applies the same method of calculating the polynomial to incoming data and then compares the answer it calculates with the incoming CRC. The probability of detecting even multi-bit errors, such as those associated with a long transmission path, is very high.

These error detection methods all correct errors by the receiving node requesting retransmission of the block of data containing the error. The retransmitted block is then checked in the same way as the originally transmitted block. But these methods do not allow for the transmitting node to take corrective action where the receiving node does not acknowledge receipt of data. This can result in the transmitting node continuing to send frames until the buffer in the receiving node is full. The disadvantage of this is that at this point no further communication with the receiving node to assist error recovery is possible, since data will be rejected by the receiving node until its buffer is cleared. In order to clear its buffer, the receiving node may pass on incomplete data. This has a further disadvantage that if the data being sent is a replacement for previous data, for example, an updated version of a previously stored file, then the previously stored file may be corrupted by the incomplete data.

Where multiple paths from a transmitting node to a receiving node exist, it is possible to take corrective action to clear the buffer associated with the failing path, and also to ensure that the incomplete data is discarded, rather than passed on from the receiving node. Recovery will usually be coordinated by a single 'master' node having access to all receiving and transmitting nodes in the network. Access by the master node may be via other receiving or transmitting nodes. The master node is permanently defined for a given network.

One disadvantage associated with the master node scheme is that a user of the network (e.g. an application) that is inputting or outputting information to or from one of the receiving or transmitting nodes to be sent to another user, may wish to define a different node as a master. Another disadvantage is that a failure of the master node would render inoperative the error recovery co-ordination for the whole network.

SUMMARY OF THE INVENTION

Accordingly the invention provides error recovery in an information communication system having the following features. A plurality of nodes are connected by links. Information is transferred between the nodes in frames of predefined types using one or more of the links. There are at least two types of predefined frames: a first type is for transferring data, and a second type is for transferring error recovery information. A plurality of nodes in the network are capable of initiating information transfers. Each of these nodes has at least two modes of operation: a data transfer mode and an error recovery mode.

The present invention is an error recovery method for use in the system just described comprising the following steps. A master node is defined for controlling the error recovery procedure. When an error is detected on a link between two nodes in data transfer mode, at least one of the nodes enters an error recovery mode, discarding data type frames at all of its ports and accepting error recovery frames at any of its ports.

The node transmits first error information to the master node. The master node then transfers second error information to all nodes capable of initiating information transfers. Those nodes which have initiated data transfers to other nodes across the faulty link transmit instructions to such nodes to discard the data frames previously sent.

Upon completion of these transmissions, the master node transmits an instruction to the nodes connected by the faulty link to return to their previous mode of operation, where frames of all types are accepted. The master node then transmits an error recovery frame to all nodes capable of initiating information transfer, cancelling the error information.

In a preferred method, the step of defining a master node comprises selection of a master node by agreement between all nodes which are capable of initiating information transfer, using predetermined criteria. Preferably each node capable of initiating information transfer has a unique identifier and the predetermined criteria for agreeing upon a master node is selection of the node having the highest value for the unique identifier.

Preferably, at least one of the nodes connected by the faulty link will attempt a retransmission of the frame that was transmitted when the error was detected, before either node switches to an error recovery mode. The retransmitted frame is checked to determine whether it has been received by the other node without error. If so, the error recovery method is terminated.

In a preferred method, the error information transmitted to the master node identifies that an asynchronous event has occurred on one of the ports of the node. The further error information transmitted by the master node identifies that a link state change has occurred.

In the preferred method, a first node detects the addition of a third node to a port on the first node, then switches from a first to a second mode of operation wherein frames of the first type are discarded by the node at all of its ports and frames of the second type are accepted by the node at any of its ports. The first node next transmits a second frame type containing error information to a master node. The master node responds by transmitting a second frame type containing the unique identity of the master to the third node. On successful completion of these transmitting steps, the master node transfers frames to the first and third node, causing them to switch to the first mode of operation, where frames of all types are accepted. The master node also transmits a second frame type containing the unique identity of the third node to all nodes capable of initiating information transfer.

Preferably the link is a serial link.

BRIEF DESCRIPTION OF THE DRAWINGS

A preferred embodiment of the invention will now be described, by way of example only, with reference to the accompanying drawings, in which.

DESCRIPTION OF THE PREFERRED EMBODIMENT

A number of conventions are used throughout this description. The bits in an uncoded data byte are numbered 7 to 0 from left to right and Bit 7 is the most-significant bit. The most-significant byte of an integer is first. Bit values are represented as, for example 1b and hexadecimal values are represented as, for example A2h.

The addressing scheme employed in the present invention distinguishes three types of node, according to the connectivity. These are single-port nodes, dual-port nodes and switches (3–16 ports). In a network employing the present invention, these nodes will typically be electronic devices such as computers, printers, storage devices etc.

Figure 1:
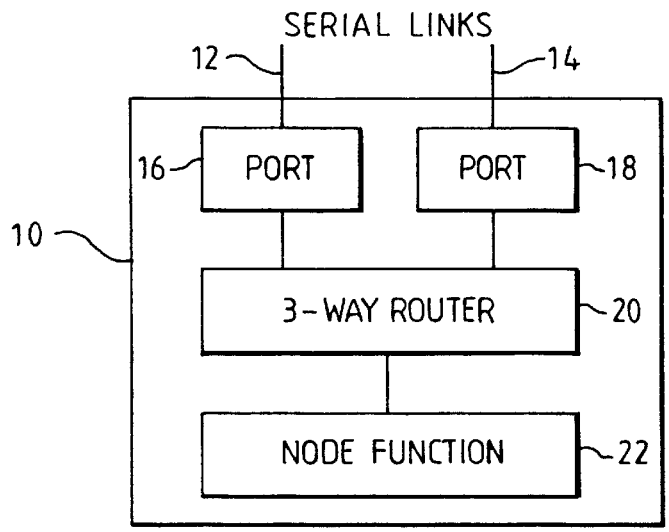
FIG. 1 depicts the major functional components of a dual-ported node such as may be found in a network using the technique of the present invention.

FIG. 1 shows a dual-port node 10 including two ports 16, 18 each connected to a serial link 12, 14. Also included is a 3-way router 20 which connects the ports to the node function 22. Depending on the address field, the router forwards an inbound frame to the node itself or to the outbound line of another port. When the node wants to originate a frame it instructs the router to transmit it on a specified port. All message and data frames relating to a particular command use the same port.

Some types of networks and components of the addressing scheme are described immediately below.

Dedicated Connection

Figure 2:
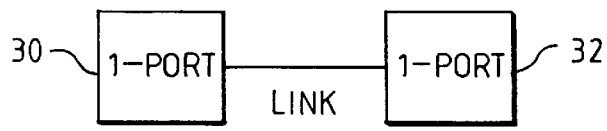
FIG. 2 is a block diagram of a simple network comprising a pair of interconnected single port nodes.

FIG. 2 shows the simplest case of a dedicated connection between 2 single-port nodes 30 and 32.

Strings

Figure 3:
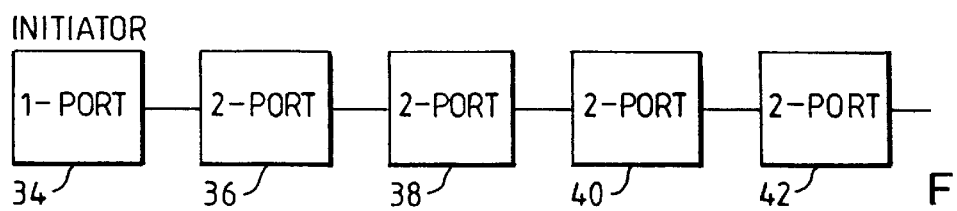
FIG. 3 is a block diagram of a network comprising a string of interconnected single port and dual port nodes with a single transmission path between nodes.

FIG. 3 shows a linear network of dual-port nodes 36, 38, 40, and 42 known as a string. To allow unrestricted communication between any two nodes the maximum number of nodes in a string is 17, including the end nodes. This is because in the preferred embodiment a single hex digit is chosen for the address of a node in the string relative to any other node in the string. For example, this allows 16 devices to be connected to a single adapter port. The extreme nodes at either end of a string can be single-port nodes 34, dual-port nodes with one disconnected port 42 or switches.

Loops

Figure 4:
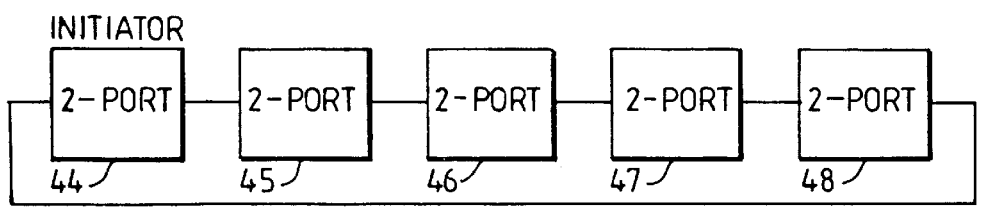
FIG. 4 is a block diagram of a network comprising a number of dual-ported nodes, such as those of FIG. 1, interconnected in a loop configuration having two possible transmission paths between nodes.

A loop is a cyclic network containing only dual-port nodes 44, 45, 46, 47, 48 as shown in FIG. 4. A loop provides better availability than a string because any single node can fail without blocking communication between any pair of the remaining nodes. A node can also be inserted into the loop or removed from the loop dynamically without preventing communication between the other nodes. To retain these availability properties the maximum number of nodes is limited to 17 for the same reasons as described in the string network above.

Switches

Figure 5:
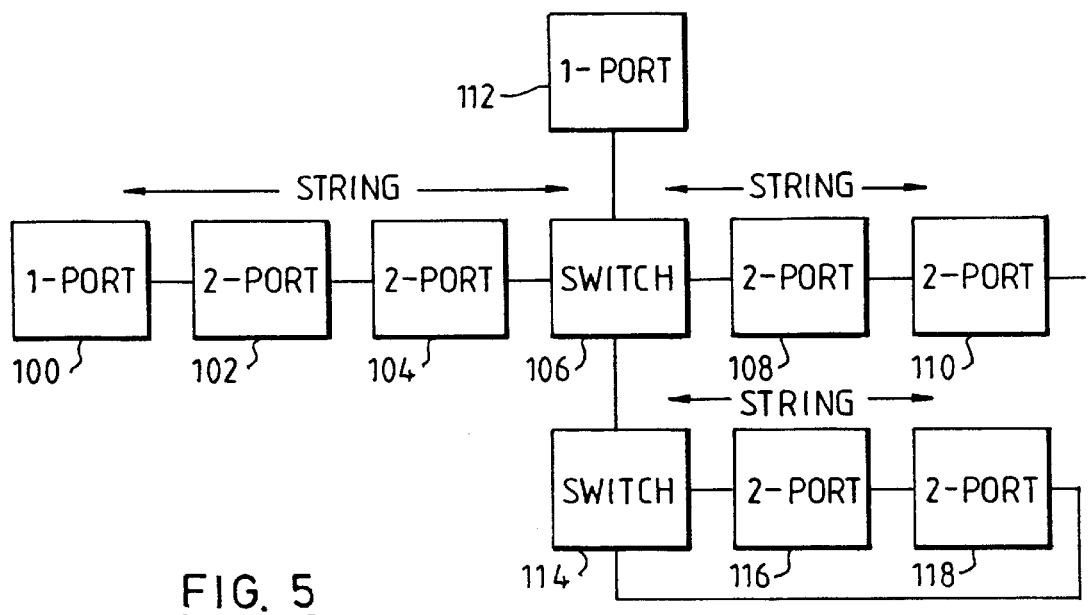
FIG. 5 is a block diagram of a complex network of interconnected nodes, including single port, dual port and switch nodes.

FIG. 5 shows a complex network including two switches 106 and 114; three strings 100,102 and 104; 108 and 110; 116 and 118; and a cyclic path linking node 118 to switch 114. Switches permit the inter-connection of a large number of nodes. They also allow alternate paths to be provided to achieve fault tolerance.

Figure 6A:
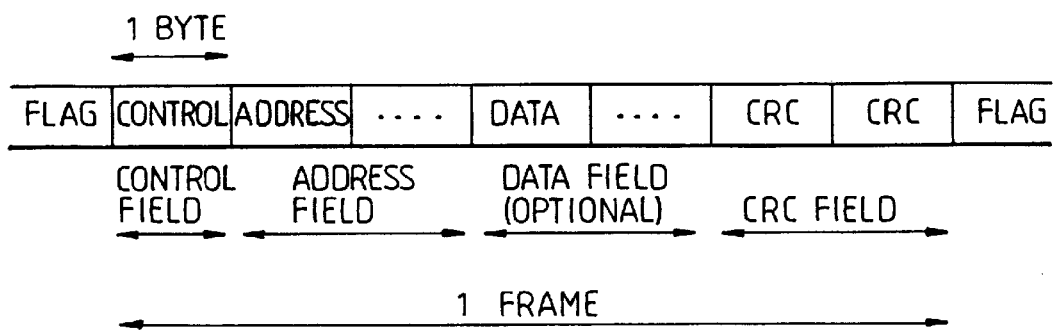
FIG. 6A shows the format of a single frame used in communication between nodes, such as those in FIGS. 2 to 5.
Figure 6B:
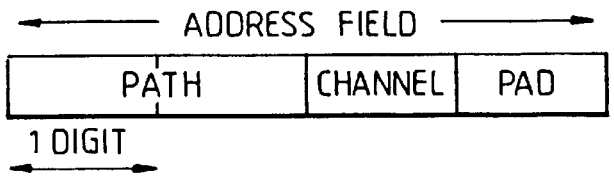
FIG. 6B shows the format of the address field component of FIG. 6A.

The two ports at opposite ends of a single serial link between nodes communicate in units called frames. A frame consists of a sequence of information bytes delimited at each end by a special protocol character known as a FLAG. A frame is divided into a sequence of 3 or 4 fields as shown in FIG. 6A.

A frame includes a one-byte control field indicating the frame type. APPLICATION frames are used to transfer messages and data in normal operation. PRIVILEGED frames are used for configuration and error recovery. The privileged messages associated with error recovery are described later. CONTROL frames are used for resets.

The frame also includes an address field between one and six bytes in length, depending on the complexity of the network and the number of channels implemented by the destination node. This field is divided into three components: PATH, CHANNEL, and PAD. The path routes the frame through the network to the destination node. The channel consists of facilities within the destination node to receive a message or to receive a single data transfer. One channel is predefined to receive messages. All other channels are dynamically allocated for data transfers. The pad, if necessary, is a single digit to make the address field up to an integral number of bytes. The value of the padding digit is normally unimportant since the destination node will have allocated the channel thus knows how many digits are needed to address it.

The frame may contain an optional data field of up to 128 bytes in length. This field carries application data or a message. Except for the messages defined later the contents of the data field are not relevant to this invention.

A two-byte CRC field is always included in a frame. This field is a standard Cyclic Redundancy Check of the control, address and data fields. The destination must not regard any of the fields as valid until the CRC field has been received and checked. This will normally require each port to buffer at least one frame in the receiver. Since the control and address field may have changed, the router in a dual-port or switch node must regenerate the CRC field when forwarding a frame. The maximum lengths of the address and data fields are chosen as a balance between network size, communication efficiency and implementation cost.

The serial link comprises a transport layer and an upper-level protocol. The transport layer defines the following functions:

The protocol, eg. framing, flow control and addressing;

Link management, eg. buffering, port states, resets, configuration and error recovery; and The physical medium, e.g. encoding, modulation, clocking, line drivers/receivers, connectors and cables.

Each implementation of the serial link is responsible for defining:

The data rate that is supported, i.e. 10 MB/s or 20 MB/s or both; and

The configuration of frame buffers in each port.

The following functions are defined by the relevant upper-level protocol:

The interpretation of the user-defined characters; and

The content of the data field in application frames, e.g. commands, status and data.

The upper-level protocol initiates data transfers by exchanging message frames between the source node and the destination node. The destination node allocates a channel to receive the data frames and indicates the number of bytes that it can currently accept.

To implement the necessary flow control, the destination sends the source two RESPONSES for each frame it receives: 1) an ACKNOWLEDGEMENT, or pair of consecutive ACK protocol characters, and 2) a RECEIVER READY, or pair of consecutive RR protocol characters.

These protocol characters are used in pairs to protect responses from being manufactured by transmission errors. A node only acts on a Response when it has received both characters of the pair without any other intervening characters.

In a network this protocol operates on each serial link independently. Responses are never forwarded by a router.

The transport layer distinguishes three types of frames: CONTROL, PRIVILEGED, and APPLICATION frames. Control frames are used for resets. The length of the data field in a control field must be zero, otherwise the receiving node will reject the frame. Control frames are actioned immediately by the destination node. They may be sent when the transmitting port is in privileged or normal mode.

Privileged frames are used by the transport layer for configuration and error recovery. They may be sent when the transmitting port is in privileged or normal mode. Application frames are used only by the upper-level protocol. The content of the data field in an application frame is of no relevance to the transport layer. When a port is in the privileged mode the transmitter discards application frames.

The contents of a data field can consist of a command, status or data. For each command a node can be classified as either an INITIATOR, i.e. the node that issued the command; or a TARGET, i.e. the node that received the command.

A port may operate in either NORMAL or PRIVILEGED mode. Normal mode allows the port to send any type of frame over the link. Normal mode is entered from privileged mode when a port receives a set_normal_mode (described later). In privileged mode the port will only send control and privileged frames to the remote node. Application frames are discarded by the transmitter. Privileged mode is entered from normal mode when there is a link error which cannot be recovered by the Link ERP. It is also entered when a port is reset.

A port is DISABLED when it is reset (for example at power-on) or when the node has suffered a catastrophic internal error. In this state all communication is disabled, except for the reception of reset control frames. The port transmitter indicates the disabled state by sending DIS characters continuously on the link. If the port has been reset then it will normally exit the disabled state automatically.

Exactly one initiator in the network must be nominated as the master. The application may select the master itself. Alternatively, the master can be elected automatically by the transport layer during configuration. For example, the initiator with the highest unique_id could be elected. During the configuration process the master informs all other nodes of its location by issuing a privileged message to each node in turn. Subsequently each node reports an asynchronous event by sending a privileged message to the master. (A typical event would be an error that cannot be recovered by the transport layer.) The master sends a privileged message to alert each other initiator and it coordinates the recovery actions.

If the master node fails or becomes disconnected then a new master must be nominated to replace it. The new master should then inform every other node of its location.

All initiators and switches are assigned a unique_id when the node is manufactured. The unique_id is typically stored in EPROM (Erasable Programmable Read Only Memory). It consists of a 4-byte vendor identification followed by a 4-byte node identification assigned by the manufacturer. Both identifications are unsigned binary integers. The unique_id is used during error recovery to identify the commands that were issued by a particular Initiator. Each potential initiator must perform a configuration process to determine the other nodes that are present and their path address(es). In the configuration process every initiator constructs a CONFIGURATION TABLE which has an entry for every other node. The entry contains a description of a node (how many ports it has, which are operational, and it's UNIQUE_ID) and its path address(es) from the Initiator. Each initiator configures the whole network when it powers on. An initiator must also perform an additional partial configuration when a new link is connected to the network. In this case each initiator will be alerted by a privileged message, as described later.

If there is a link error that cannot be recovered by the transport layer each initiator is also alerted by a privileged message. If the error is permanent (for example the link has been disconnected) each initiator unconfigures the path(s) to those nodes beyond the error by deleting them from its configuration table.

During the configuration process every target builds an INITIATOR TABLE. Each table entry contains the unique_ id of an initiator and a return address from the Target to that initiator. If an initiator is using alternate paths to the same target then the table will contain one entry for each path.

The initiator table is used to quiesce outstanding commands during error recovery.

Error Recovery

The transport layer of the link includes a Link Error Recovery Procedure (LINK ERP) that attempts to recover errors by retransmitting the last 1 or 2 frames. The strategy for recovering errors in a complex network with multiple initiators will now be described. The strategy ensures data integrity and minimizes the impact to other operations. For example, an error will not result in bad data being written to a disk drive. Also an error affects only the commands, initiators and targets currently using the failing link or node.

A number of link errors may occur. A HARDWARE ERROR is indicated when a port detects an internal hardware error, for example a parity check.

A LINE FAULT error is indicated when the line driver or receiver detects an invalid voltage and the port is not in the disabled state. The cable may be open or short circuit or the remote node may be powered off.

An ACK TIME-OUT error is indicated when the source port does not receive an ACK response within the specified time after transmitting the trailing FLAG of a frame other than reset.

In addition to link errors, receiver errors may also occur. A LOSS OF SYNCHRONIZATION error is indicated when the clock recovery circuits in the receiver detect a synchronization error. A CODE VIOLATION error is indicated if the receiver has not detected a 'loss of synchronization' error and it decodes a character which either is not in the defined alphabet or causes a disparity violation. A PROTOCOL ERROR is indicated if none of the receiver errors above has occurred and a port receives an incorrect sequence of valid characters as listed here:

1. A short frame with less than 4 data characters between 2 FLAG characters. This may be caused by noise corrupting or manufacturing a FLAG.
2. A privileged or application frame and no buffer is available, i.e. when RR_pending is set.
3. An isolated RR character. One half of the link will hang if an RR response is lost without any errors being detected, e.g. if both RR characters are changed to FLAG characters while the link is idle. This is extremely unlikely and therefore no recovery is provided in the transport layer. Instead the application should provide a time-out for each operation in progress.
4. An unexpected ACK response, i.e. when Waiting_for_ACK is reset.
5. An isolated ACK character. If an ACK response is corrupted then the transmitter will also detect an ACK time-out.
6. A NULL character with no intervening data character since the last FLAG. 7. An ABORT character with no intervening data character since the the last FLAG.
8. An ABORT character that is not immediately followed by a FLAG. A CRC ERROR is indicated if a received frame has bad CRC, the frame has not been aborted and none of the receiver errors above has occurred.

A SEQUENCE ERROR is indicated when a received frame has frame sequence number not equal to received sequence number, the frame has not been aborted, the frame is not a control frame and none of the receiver errors above has occurred. A previous frame has probably been lost.

A FRAME REJECT error is indicated when a frame is received correctly with none of the receiver errors above, the frame has not been aborted, but the frame is unacceptable for any of the following reasons:

1. The frame contains more than 137 data characters. Note that the receiver must continue to accumulate the CRC until the trailing FLAG in order to verify that there hasn't been a transmission error, e.g. a corrupted FLAG.
2. The frame length is otherwise unacceptable to the implementation, for example a message frame is too long.
3. The control field is invalid.
4. The address field specifies a destination that is not implemented or currently invalid.
5. The length of the data field in a control frame is not zero. Errors in this class are generally due to programming, synchronization or compatibility problems.

An Error Recovery Procedure (ERP) is defined for the link to recover link errors at the frame level and offers a number of benefits. The Link ERP simplifies the upper-level protocol since recovery is transparent if successful. Moreover, There is normally no need to terminate any operations when an error occurs. However a device with limited buffering may overrun as a result of the extra time taken by the Link ERP. As another benefit, uncertainty about the state of the application in the remote node is avoided. And finally, the compatibility of different link implementations is enhanced.

It is expected that the Link ERP will normally be implemented in firmware running on the node processor. However the functions could conceivably be performed by a hardware finite state machine if performance is critical.

If the ERP determines that a TRANSMISSION error occurred then it attempts to recover the error itself. If recovery is successful the Link ERP terminates and the upper-level protocol continues unaware of the error.

The ERP cannot recover some errors transparently, such as hardware errors or permanent line faults. The ERP has been carefully designed so that both nodes will always recognize an unrecoverable error and remain synchronized. In these cases the ERP exits. Where possible, recovery is then attempted by command retry, as described later. The Link ERP implements a number of basic principles which will be described now. Only the failing link invokes the Link ERP. Other links in the network are not involved. In addition, the Link ERP recovers privileged and application frames only. It does not recover control frames.

In normal operation the transmitter does not discard a privileged or application frame until it has received an ACK response. This indicates that the frame has been received correctly by the destination port. Thus when an error occurs the affected frame(s) are still available for retransmission without reference to the upper-level protocol. When an error is detected both ports, the Link ERP and exchange status are invoked by means of Link Resets.

Recovery is performed separately for each line. Each port is responsible for recovering frames that were lost on its outbound line. Because the transmitter is allowed to start sending another frame before it receives an ACK response, up to 2 frames may need to be retransmitted.

Before restarting communication the Link ERP forces the port into the disabled state. This synchronizes the ERP's in both nodes and allows an orderly restart with the same mechanisms that are used at power-on.

The link protocol and ERP are designed to minimize the chances of losing or duplicating any frames when an error occurs. However the upper-level protocol should protect against these events wherever possible. For example, the byte count can be checked for zero at the end of a data transfer and time-outs can be used to detect lost messages.

During error recovery the Link ERP in each node builds a LINK STATUS BYTE and sends it to the other node in the address field of a LINK RESET frame. The link status byte is defined as follows.

```
*--------------------------------------------------------*
]H/W][Line] ACK ] Receiver errors]    RSN    ]
]error][fault] T/O ]                ]           ]
*--------------------------------------------------------*
   Bit:  7    6    5    4        2    1    0
```

The H/W ERROR bit;, when set to 1b, indicates that the port detected an internal hardware error.

The LINE FAULT bit, when set to 1b, indicates that the line driver or receiver detected a fault on the line. It is provided for diagnostic information only and it is not referenced by the Link ERP in the destination node.

The ACK T/O bit, when set to 1b, indicates that the transmitter timed-out while waiting for an ACK response. It is provided for diagnostic information only and it is not referenced by the Link ERP in the destination node.

The RECEIVER ERRORS field contains a 3-bit code to identify the first error detected by the receiver, defined as follows:

| | |
|---|---|
| 0 0 0 | No error |
| 0 0 1 | Loss of synchronization |
| 0 1 0 | Code violation |
| 0 1 1 | Protocol error |
| 1 0 0 | CRC error |
| 1 0 1 | Sequence error |
| 1 1 0 | Frame reject |
| 1 1 1 | Reserved |

When two or more errors occur simultaneously the lowest number is reported.

The RSN is the Receive Sequence Number for the last privileged or application frame that was acknowledged by the port. It is needed by the Link ERP in the remote node.

To facilitate cross-referencing, when the the ERP fails each 'exit' is identified by a name in the description below. The first (or only) port that detects the error invokes its Link ERP. The Link ERP then proceeds as will be described now.

The ERP waits until the transmitter has finished sending the current frame, if any. Optionally the transmitter may choose to abort the current frame. The ERP then builds the Link Status Byte by reference to the hardware.

If the line driver or receiver has detected a line fault then the ERP tries to reset the error. If this fails then the ERP exits indicating 'Permanent line fault'. The ERP checks whether the receiver is detecting DIS characters. If so, the remote port may have entered the disabled state due to a catastrophic error. The ERP exits indicating 'Remote port Disabled'.

The ERP constructs a link reset frame (see below) containing the link status byte. It then sends two successive link reset frames to the remote node. Repeating the link reset in this way allows for either frame to be corrupted by noise. The remote port should now enter the check state, if it has not already done so. Either way it will invoke its Link ERP and return two link resets containing the remote link status byte. The link reset frame will have the format below:

| | |
|---|---|
| Control field | Message_code = 0Ch |
| Address field | Link Status Byte |
| Data field | Must be absent |
| CRC field | Must be correct |

Link reset is confined to a single link. It is never propagated from one link to another.

The ERP checks whether a link reset has already been received from the remote node. If not the ERP starts a time-out and waits to receive a link reset. If no link reset has been received within 1 ms after the local node sent its second link reset then the ERP exits indicating 'Link Reset failed'. The implementation must protect against the ERP looping if there is a permanent error. The following is an example of one method that can be used.

Each invocation of the ERP increments a retry counter that is reset to zero periodically by a timer. If the number of retries in one period of the timer exceeds some maximum value then the ERP exits indicating 'Retry limit exceeded'. This scheme also protects against excessive use of the ERP in the event of severe external noise.

If either port has detected a hardware error then the ERP exits indicating 'Hardware error'.

If either port has indicated 'frame reject' then further communication may be meaningless. The ERP exits indicating 'Frame rejected'.

Otherwise the ERP calculates the number of outbound frames for which an acknowledgement is outstanding. The ERP also calculates the number of outbound frames for which the local port is expecting an acknowledgement but which have not been received by the remote port. If either of these checks fails the ERP exits indicating 'Invalid retry status'. Otherwise the ERP arranges to resend the lost frames. Those outbound buffers that do not need to be retransmitted must now be discarded.

If the port has received a frame containing any receiver errors (described above) then the appropriate inbound buffer must be discarded. Otherwise the ERP does not need to deal with the inbound buffers. If any are full they will be emptied by the upper-level protocol. The ERP disables the port and resets all of the latches for hardware errors, ACK time-out and receiver errors. The ERP then waits until the remote port enters the disabled state, as indicated by the receiver detecting DIS characters. This is required to synchronize the two Link ERP's and prevent the transmitter from sending a frame while the remote port is not in the normal mode.

If the receiver does not detect DIS characters within 1 ms after the local port is disabled then the ERP exits indicating 'Time-out waiting for disabled state'. The remote port may be indicating an unrecoverable error.

Otherwise the ERP enables the port. The ERP waits for the port to become ready. This indicates that the remote port has completed its recovery.

If the link does not become ready within 1 ms after the local port entered the enabled state then the ERP exits indicating 'Time-out waiting for ready state'. This may indicate that the remote node has powered-off or suffered a catastrophic error. Otherwise the ERP terminates successfully.

The actions each node should take if the Link ERP exits unsuccessfully will be described now, as well as a set of primitives and some procedures for dealing with events that are outside the scope of the Link ERP. These events are as follows:

A) The Link ERP fails. This could be a transient unrecoverable error or a permanent error such as a disconnected link.

B) A Target node does not respond to a command.

C) A router receives a frame which is addressed to a port that is not operational.

D) A node receives an invalid message and it does not know the return address.

E) A new link is connected to the network.

For the first 4 events (A–D) the initiators will typically terminate the affected commands and retry them, using an alternate path if necessary. In the last case (E) no commands should be affected.

The messages to support error recovery will be defined now. In all cases the control field indicates a frame type of 'privileged'. A SET_MASTER message is sent from the master to every other node in the network during the configuration process. It specifies a return_address and a tag to be used when the node wants to send the Master a link_alert message. The destination node records this information and returns a response message.

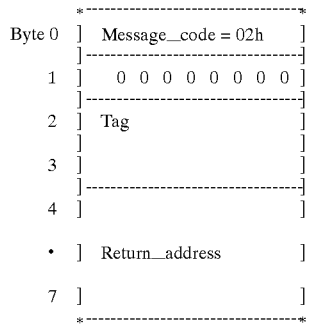

The MESSAGE_CODE byte identifies the message as 'set_master'.

The 2-byte TAG field is returned in the response message. The same Tag is also used in a Link_alert message if the node subsequently reports a link state change. The tag is assigned by the master and must be unique among the tags that are currently active from the master. It remains active until the node receives another set_master message.

The 4-byte RETURN_ADDRESS field specifies the value that should be placed in the address field of the resulting response message and any subsequent link_alert. If a node receives set_master and it has a port in privileged mode then it should send a link_alert to the master before sending the response for set_master. A node only stores the return_address and tag for the most-recent set_master that it has received.

The RESPONSE message is returned to acknowledge the set_master, master_alert, quiesce and set_normal_mode messages. Response is sent on the same port that received the original message.

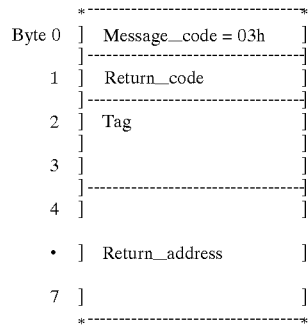

The MESSAGE_CODE byte identifies the message as 'response'.

The RETURN_CODE byte is set to 00h if the original message was processed successfully. Any other value indicates that the requested function could not be completed.

The 2-byte TAG field is copied from the original message. It identifies the message that is being acknowledged. The address field in the response is obtained from the return_address field in the message being acknowledged.

A node sends the LINK_ALERT message to inform the master of an asynchronous event on one of its ports. The master does not respond directly.

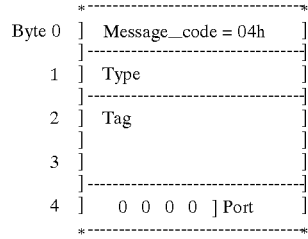

The MESSAGE_CODE byte identifies the message as 'link_alert'.

The TYPE byte is coded to indicate the event. The main types are as follows:

Port now operational. This indicates that a new link has been connected.

Addressed port not operational. This indicates that the router received a frame that could not be forwarded.

Message reject. This indicates that the node received an invalid message and it does not know the return address, e.g. message_code is invalid.

Permanent fault. The Link ERP failed because, for example, the link has been disconnected.

Unrecoverable error. This indicates a transient error that could not be recovered by the Link ERP.

Remote port not responding. This indicates that the remote port did not respond during the Link ERP.

Remote port disabled. The Link ERP was entered because the port received DIS characters. For example, the remote node may have been reset or it may have suffered a catastrophic internal error.

The 2-byte TAG field contains the tag specified by the most recent set_master message. It allows the master to determine which node has sent the link_alert.

The PORT field, bits 3:0, contains an unsigned integer to identify the affected port.

The address field in a link_alert message is obtained from the return_address field in the most recent set_master message. The MASTER_ALERT message is sent from the master to each other initiator. It has two uses: 1) to forward a link_alert for an asynchronous event; and 2) to indicate that both ports of a link have been put into normal mode, for example following error recovery. In both cases the initiator returns a response message to the master.

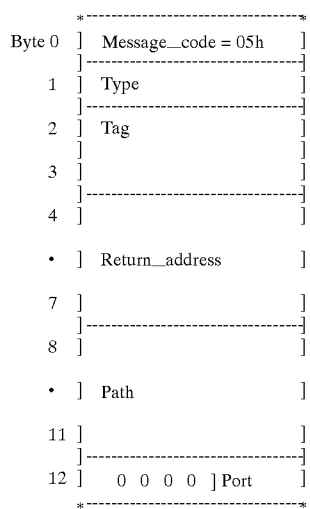

The MESSAGE_CODE byte identifies the message as 'master_alert'.

If the master_alert is forwarding a link_alert then the TYPE is copied from the corresponding link_alert. In this case the destination initiator should quiesce any commands that were using the specified path before returning the response. If the master is indicating that both ports of link have been returned to normal mode then this byte is set to FFh.

The 2-byte TAG field is assigned by the master and returned in the response from the destination initiator. It must be unique among all the tags currently active from the master.

The 4-byte RETURN_ADDRESS field specifies the value that should be placed in the address field of the response message.

The 4-byte PATH field specifies the address node that generated the link_alert, relative to the initiator that received master_alert.

The PORT field, bits 0:3, is copied by the master from the corresponding link_alert message. The QUIESCE message is sent from an initiator to a target during error recovery to quiesce all commands from a specified initiator. The target returns a response message after it has quiesced the affected commands. The target does not return status for the quiesced commands.

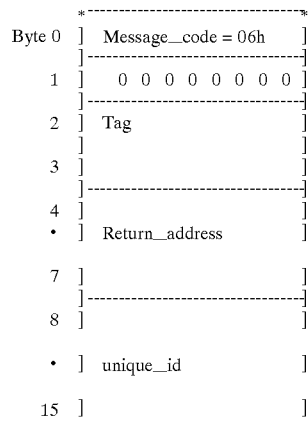

The MESSAGE_CODE byte identifies the message as 'quiesce'.

The 2-byte TAG field is assigned by the initiator and returned in the response from the target.

The 4-byte RETURN_ADDRESS field specifies the value that should be placed in the address field of the response message.

UNIQUE_ID is the 8-byte unique_id of the initiator whose commands are to be quiesced. The target must search its initiator table to convert the unique_id to a return_ address before selecting the commands to be quiesced. Specifying the initiator with a unique_id rather than a return_address allows an initiator to use an alternate path for the quiesce if the original path is no longer available. It also allows the master to issue a '3rd party' quiesce on behalf of a missing initiator.

The SET_NORMAL_MODE message is sent by the master to change a port from privileged mode to normal mode. The destination node returns a response message. When the ports at both ends of a link have been placed in normal mode the link can be used for application frames.

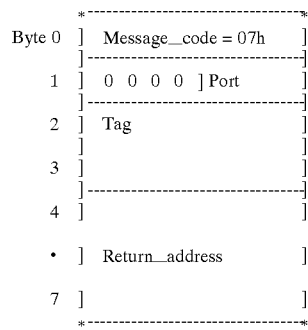

The MESSAGE_CODE byte identifies the message as 'set_normal_mode'.

The PORT field, bits 3:0, contains an unsigned integer which identifies the port to be changed to normal mode.

The 2-byte TAG field is assigned by the master and returned in the response from the destination node. It must be unique among all tags currently active from the master. The 4-byte RETURN_ADDRESS field specifies the value that should be placed in the address field of the response message.

The recovery procedures employing the previous concepts and privileged messages will be described next.

A) Link ERP Fails

This condition indicates that the error was unrecoverable by the transport layer. Both ports of the failing link enter privileged mode and so their transmitters discard application frames. This avoids frames backing up and blocking other traffic. It also prevents any further data from being transferred through the affected link and being written onto magnetic media.

Each node sends a link_alert message to the master, provided the return_path specified by set_master during configuration does not include the failing link. Thus the master will receive 1 or 2 link_alert messages. Recovery then proceeds according to the following steps.

If the link_alert indicates 'Remote port not responding' then the master issues a reset control frame to the failing node immediately. The master then unconfigures the affected link(s) and node(s). (If the failing node recovers after the reset then the adjacent node(s) will generate another link_alert indicating 'Port now operational'. This will cause the affected links and nodes to be reconfigured.) If the link_alert indicates 'Remote port disabled' the remote node may have been reset or it may have suffered a catastrophic internal error. In the first case the remote node will normally re-enable the port itself. In the second case the node may require to be reset. The master waits up to 1 second to receive another link_alert from the adjacent node indicating 'Port now operational'. This link_alert indicates that the node has now recovered. If the link_alert is not received the master assumes the cause was a catastrophic error and it issues a reset control frame to the node. In this case the master unconfigures the affected link(s) and node(s). If the link_alert indicates 'Permanent fault' then the master also unconfigures the affected link(s) and node(s).

The master next issues a master_alert to each other initiator that remains in its configuration table. If the master_alert indicates a permanent fault or a node has been reset then the other initiators unconfigure the affected link(s) and node(s). Each initiator identifies those commands that were in progress over the failing link and it stops the associated outbound data transfers.

Each initiator issues a quiesce message to each target that was executing an affected command, providing the target remains configured (possibly by using an alternate path). If the master determines that a previous initiator has been removed from the network by the error then it sends a '3rd party' quiesce to ALL remaining targets on behalf of the missing initiator. The targets return a response message for each quiesce. Each other initiator sends a response message to the master for the master_alert message when all of its affected targets have been quiesced.

If the link is still configured the master sends a set_normal_mode to each port. The master waits for the response messages for set_normal_mode.

The master sends a master_alert message to each other initiator to indicate that both ports are now in Normal mode. Each initiator returns a response. If the link is still configured or there is an alternate path each initiator reissues its affected commands.

B) Target Does Not Respond

An initiator is expected to start an anti-hang timer for each command that it issues to a target. The timer is stopped when the initiator receives status indicating that the target has finished processing the command. The timer protects against an undetected link failure in the path to the target node or a software failure in the target itself. If the timer expires before it is stopped then the initiator should proceed according to the following steps.

The initiator issues a privileged message to query each intermediate node in turn, starting with the adjacent node. If any node does not reply then that node is assumed to be hung. Otherwise the target node is hung.

The initiator issues a reset control frame to the node which is hung. This will disable all ports on that node. The connected ports in the adjacent nodes will detect this, invoke the Link ERP and generate a link_alert indicating 'Remote port disabled'. This will be handled as previously described.

C) Addressed Port Not Operational

A frame could be addressed erroneously to a router port that is not operational. This is handled by the following procedure.

The node detecting the error sends a link_alert to the master indicating 'Addressed port not operational'. The port remains in privileged mode.

The master issues a master_alert to each other initiator specifying 'Addressed port not operational'. Each initiator responds by terminating any affected commands and the associated outbound data transfers. Then it returns a response. If there is an alternate path each initiator reissues its affected commands.

D) Invalid Message Received

If the destination node receives an invalid message (for example the message had an invalid parameter) and knows the return address then it returns a response with a non-zero return_code. Otherwise the destination node generates a link_alert specifying 'Message reject'. This is handled similar to the case of 'Addressed port not operational' above except that the port remains in Normal mode.

E) New Link Connected

When a new link is connected to the network a port on one of the existing nodes will become operational. The node sends a link_alert to the master specifying 'Port now operational'. The master then configures the new node(s). The master issues set_master to the new node(s). Each node returns a response. Next, the master issues set_normal_mode to the port that generated the link_alert and the other new port(s). Each port returns a response.

The master sends a master_alert specifying 'Port now operational' to each other initiator. Each initiator returns a response. Every other initiator then configures the new node(s).

EXAMPLES

Figure 7:
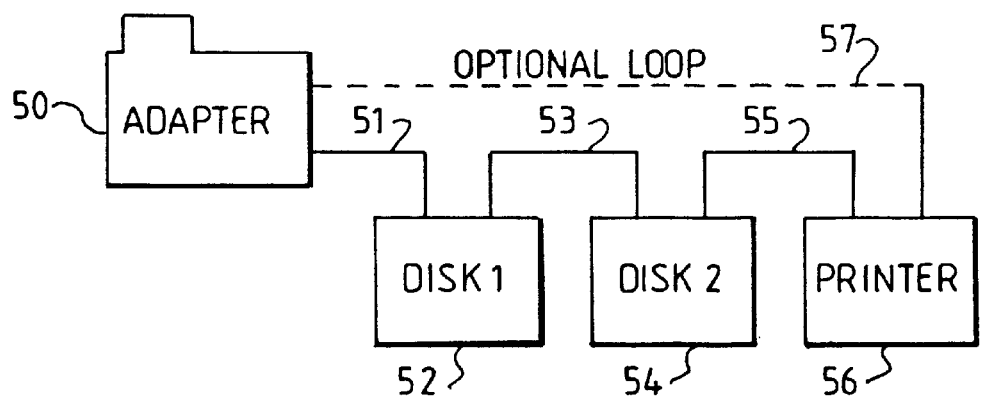
FIG. 7 is a block diagram of a personal computer system in which the present invention may be employed.

The error recovery method described above may be used in a variety of different applications, two examples of which are described below. It will be appreciated that the present invention can readily be used in other types of networks. A string of dual-ported devices is particularly attractive for connecting I/O devices to a personal computer, as shown in FIG. 7. Adapter 50 which will typically reside in the system unit of a personal computer is attached via link 51 to disk drive 52 which is in turn attached to disk drive 54 via link 53 which is in turn attached to printer 56 via link 55. The use of a string reduces the attachment cost per device and avoids wiring congestion at the adapter. The use of the error recovery technique of the present invention prevents an error resulting in bad data being written to a disk drive or incorrect data being printed. Optionally the loop can be closed by provision of link 57 to provide increased bandwidth or a measure of fault-tolerance. An error only affects commands using the failing link or node, so with the closed loop all nodes apart from the failing one can still be accessed.

Figure 8:
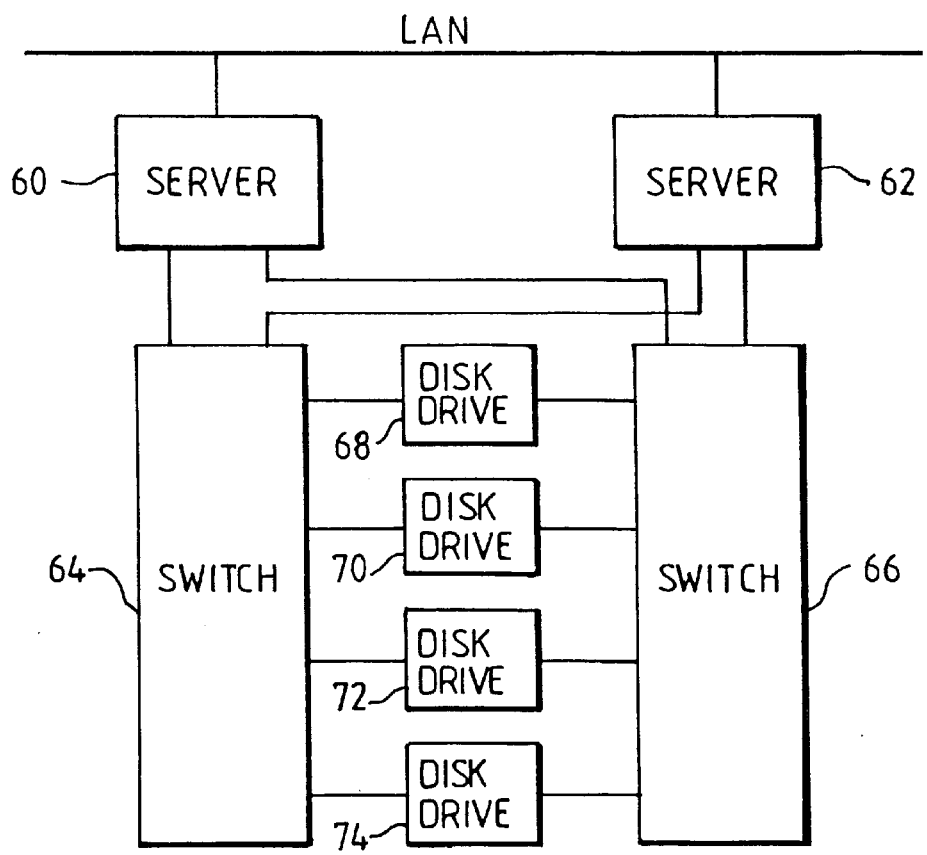
FIG. 8 is a block diagram of a file server system in which the present invention may be employed.

FIG. 8 shows a typical network configuration that could be used as a high availability file server. High availability is important in such a shared system. This application also requires dual-ported disk drives, but this time the main reason for the second port is to provide a backup path in the event of a failure in the primary attachment path. Therefore in practice all serial disk drives will probably be dual-ported. In conjunction with disk arrays, dual-ported disk drives allow configurations with no single point of failure, as shown in FIG. 8. In this configuration a pair of servers 60 and 62 are connected via dedicated links to both switches 64 and 66 and each port of the dual-ported disk drives 68, 70 72 and 74 is connected to one of the switches. The use of dedicated links to each drive allows full concurrent maintenance with no impact to the operation of other drives.

We claim:

1. An error recovery method for use in an information communication system network comprising a plurality of nodes connected by links, information being transferred in frames of predefined types between the nodes via one or more of the links, the predefined types including a data frame for transferring data and an error recovery frame for transferring error information, each node including a buffer for receiving the frames, the plurality of nodes including a plurality of initiator nodes capable of initiating the transfer of information, the method comprising the steps of:

selecting one of the initiator nodes to be a master node for controlling data error recovery;

if a link fails between a first and a second node of the network at least one node of the first and second nodes asynchronously discarding data frames received over the failed link and initiating an error recovery mode by transmitting to the master node error information identifying the failed link;

the master node, upon receiving the error information, transmitting to the initiator nodes an error recovery frame including the error information; and each initiator node that has transferred data frames for receipt by another node of the network over the failed link, upon receiving the second error recovery frame, transmitting instructions to the receiving node to discard the data frames in its buffer to prevent transmission of incomplete or erroneous data.

2. The error recovery method of claim 1, further comprising the step of conditioning the at least one node, after the link failure, to accept only frames of the error recovery frame type.

3. The error recovery method of claim 2, further comprising, after the preceding steps, the step of transmitting by the master node to the at least one node an error recovery frame for conditioning the at least one node to accept frames of both the data and error recovery frame types, thereby terminating the error recovery mode.

4. The error recovery method of claim 1, wherein the step of defining a master node further comprises selecting a master node by agreement of all initiator nodes using predetermined criteria.

5. The error recovery method of claim 1, wherein each initiator node is associated with a unique value, and wherein the initiator node having the highest unique value is selected to be the master node.

6. The error recovery method of claim 1, further comprising the steps of:

after the link failure and prior to transmitting error information to the master node, retransmitting by the at least one node of any data frames previously transmitted over the failed link;

determining whether the retransmitted data frames are received by the other node without error; and if the retransmitted frames are received without error, terminating the error recovery method.

7. The error recovery method of claim 1, further comprising the steps of:

upon addition of a new node to the system by the establishment of a new link between the new node and one of the system nodes, the system node transmitting to the master node information identifying the new link; and the master node, upon receiving the information, transmitting to the new node the location of the master node and a unique identifier to be associated with the new node, and transmitting to the initiator nodes an error recovery frame for causing each initiator node to configure the new node.

8. The error recovery method of claim 1, further comprising, after the preceding steps, the step of transmitting by the master node to each initiator node an error recovery frame to cancel the error information.

9. An error recovery apparatus for use in an information communication system network comprising a plurality of nodes connected by links, wherein information is transferred in frames of predefined types between the nodes via one or more of the links, the predefined types including a data frame for transferring data and an error recovery frame for transferring error information, each node including a buffer for receiving the frames, the plurality of nodes including a plurality of initiator nodes capable of initiating the transfer of information, the apparatus comprising:

means for selecting one of the initiator nodes to be a master node for controlling data error recovery;

means responsive to a link failure between a first and a second node of the network for at least one node of the first and second nodes asynchronously discarding data frames received over the failed link, and means for initiating an error recovery mode by asynchronously transmitting by the at least one node to the master node error information identifying the failed link;

means responsive to receipt of the error information, for transmitting by the master node to each initiator node of an error recovery frame including the error information; and means associated with each initiator node and responsive to receipt of the error recovery frame, for transmitting by the initiator node to other nodes of the network to which it has transferred data frames over the failed link, instructions to discard the data frames in its buffer to prevent transmission of incomplete or erroneous data.

10. The apparatus of claim 9, further comprising means for conditioning the at least one node, after the link failure, to only accept frames of the error recovery frame type.

11. The apparatus of claim 10, further comprising means for transmitting, by the master node to the at least one node, an error recovery frame for conditioning the at least one node to accept frames of both the data and error recovery frame types, thereby terminating the error recovery mode.

12. The apparatus of claim 9, wherein the selecting means further comprises means for selecting a master node by agreement of all initiator nodes using predetermined criteria.

13. The apparatus of claim 9, wherein each initiator node is associated with a unique value, and further comprising means for selecting the initiator node having the highest unique value as the master node.

14. The apparatus of claim 9, further comprising:

means for retransmitting, after a link failure, by the at least one node data frames transmitted over the failed link; and means for determining if the retransmitted frames are received without error.

15. The apparatus of claim 9, further comprising:

means, responsive to a new node added to the system by establishment of a new link between the new node and one of the system nodes, for transmitting by the system node to the master node information identifying the new link;

means for transmitting, by the master node to the new node, a unique identifier to be associated with the new node;

means for transmitting, by the master node to the new node, the location of the master node; and means for transmitting, by the master node to each initiator node, an error recovery frame for causing each initiator node to configure the new node.

16. The apparatus of claim 9, further comprising means for transmitting, by the master node to each initiator node, an error recovery frame canceling the error information.

17. An information communication system network, comprising:

a plurality of nodes connected by links, wherein information is transferred in frames of predefined types between the nodes via one or more of the links, the predefined types including a data frame for transferring data and an error recovery frame for transferring error information, each node including a buffer for receiving the frames, the plurality of nodes including a plurality of initiator nodes capable of initiating the transfer of information;

means for selecting one of the initiator nodes to be a master node for controlling data error recovery;

means responsive to a link failure between a first and a second node of the network, for at least one node of the first and second nodes asynchronously discarding data frames received over the failed link, and means for initiating an error recovery mode by asynchronously transmitting by the at least one node to the master node error information identifying the failed link;

means responsive to receipt of the error information, for transmitting by the master node to each initiator node an error recovery frame including the error information; and means associated with each initiator node and responsive to receipt of the error recovery frame, for transmitting by the initiator node to other nodes of the network to which it has transferred data frames over the failed link, instructions to discard the data frames in its buffer to prevent transmission of incomplete or erroneous data.

18. The system of claim 17, further comprising means for conditioning the at least one node, after the link failure, to only accept frames of the error recovery frame type.

19. The system of claim 18, further comprising means for transmitting, by the master node to the at least one node, an error recovery frame for conditioning the at least one node to accept frames of both the data and error recovery frame types, thereby terminating the error recovery mode.

20. The system of claim 17, wherein the selecting means further comprises means for selecting a master node by agreement of all initiator nodes using predetermined criteria.

21. The system of claim 17, wherein each initiator node is associated with a unique value, and further comprising means for selecting the initiator node having the highest unique value to be the master node.

22. The system of claim 17, further comprising:

means for retransmitting, after a link failure, by the at least one node data frames previously transmitted over the failed link; and means for determining if the retransmitted frames are received without error.

23. The system of claim 17, further comprising:

means, responsive to a new node added to the system by establishment of a new link between the new node and one of the system nodes, for transmitting by the system node to the master node information identifying the new link;

means for transmitting, by the master node to the new node, a unique identifier to be associated with the new node;

means for transmitting, by the master node to the new node, the location of the master node; and means for transmitting, by the master node to each initiator node, an error recovery frame for causing each initiator node to configure the new node.

24. The system of claim 17, further comprising means for transmitting, by the master node to each initiator node, an error recovery frame canceling the error information.

* * * * *